United States Patent [19]

Smeggil et al.

[11] 3,892,601

[45] July 1, 1975

[54] COATED AIR-STABLE COBALT-RARE EARTH ALLOY PARTICLES AND METHOD

[75] Inventors: John G. Smeggil, Elnora; Richard J. Charles, Schenectady, both of N.Y.

[73] Assignee: General Electric Company, Schenectady, N.Y.

[22] Filed: Mar. 14, 1974

[21] Appl. No.: 451,030

Related U.S. Application Data

[62] Division of Ser. No. 372,691, June 22, 1973, Pat. No. 3,856,580.

[52] U.S. Cl... 148/31.57; 117/100 M; 117/107.2 R; 148/103; 148/105
[51] Int. Cl.² .................... C04B 35/00; C23C 11/00
[58] Field of Search ........ 148/31.57, 101, 103, 105, 148/175; 117/100 M, 130, 107.2 R; 29/192 CP

[56] References Cited
UNITED STATES PATENTS

| | | | |
|---|---|---|---|
| 3,385,725 | 5/1968 | Schmeckenbecher | 117/130 |
| 3,492,175 | 1/1970 | Conrad et al. | 148/175 |
| 3,591,428 | 7/1971 | Buschow et al. | 148/31.57 |
| 3,615,914 | 10/1971 | Becker et al. | 148/101 |

OTHER PUBLICATIONS

Harwood, J.; Industrial Applications of Organometallic Compounds, New York, 1963, pp. 88 and 384.

*Primary Examiner*—Walter R. Satterfield
*Attorney, Agent, or Firm*—Jane M. Binkowski; Joseph T. Cohen; Jerome C. Squillaro

[57] ABSTRACT

A process for producing novel air-stable coated particles of a magnetic transition metal-rare earth alloy. An organometallic compound which decomposes at a temperature below 500°C is heated to produce a metal vapor which is contacted with particles of a transition metal-rare earth alloy to deposit a metal coating thereon.

4 Claims, No Drawings

COATED AIR-STABLE COBALT-RARE EARTH ALLOY PARTICLES AND METHOD

This is a division of application Ser. No. 372,691 filed June 22, 1973 now U.S. Pat. No. 3,856,580.

The present invention relates generally to the art of making magnets. More particularly, it is concerned with new metal-coated magnetic material powders having unique characteristics and a novel method for producing these coated powders, and with magnets wherein these coated powders are the active magnetic components.

Magnetic properties of bulk magnetic materials having large magnetocrystalline anisotropies can be enhanced by reducing them to powders particularly those having an average particle size of less than 10 microns. The asground powders can be incorporated in bonding media to provide composite permanent magnets having properties substantially superior to those of the bulk source materials. However, when good magnetic properties are attained in the as-ground powders, for example, cobalt-rare earth powders, they tend not to be stable. As the powders are exposed to air at room temperature and at slightly elevated temperatures, their intrinsic coercive force, $H_{ci}$, which is a measure of a magnet's resistance to demagnetization, decreases irreversibly. Specifically, these magnetic powders are quite reactive to oxygen and water vapor in the atmosphere at room temperature, and they are even more so reactive at even slightly elevated temperatures, i.e., about 100°C, resulting in a significant loss in their intrinsic coercive force. Thus, a comparatively low value of intrinsic coercive force can substantially diminish the advantages to be gained by converting the bulk body to a powder or producing the powder by some other technique, and fabricating a composite finished article from the powder.

The art has used sintering to produce magnets with substantially stable properties from these powders. This process comprises compacting the powder to form a green body and sintering the body at high temperatures, generally about 1000°C, in an inert atmosphere to produce a high density compact having a closed pore structure. Such a structure protects the magnet from the atmosphere resulting in long term stability of its magnetic properties. However, this method is expensive, since it requires power-consuming equipment and handling procedures which are time-consuming.

A more desirable approach to the fabrication of magnets using these powders, for example cobalt-rare earth alloy powders, would delete the sintering process and merely compact the aligned particles into the desired shape with the aid of some kind of binder. However, to do this requires the use of air stable, accordingly coated, cobalt-rare earth alloy particles.

Attempts to provide cobalt-rare earth alloy powder with a protective metal coating deposited from metal vapor of a molten metal have yielded limited success. For example, temperatures of 500°C and higher significantly deteriorate the magnetic properties of the loose powder. Such a method, therefore, can utilize only a very few low melting metals, which also must produce sufficient vapor pressures for effective coating deposition at temperatures not much higher than their melting point, such as lead with a melting point of 328°C or zinc with a melting point of 419°C. However, most metals, especially those which are most inert and generally the most desirable, have very high melting points and usually require temperatures significantly higher than their melting points to produce vapor pressures which are effective for coating. For example, aluminum, a highly inert and desirable metal, melts at 660°C and requires significantly higher temperatures to produce vapor pressures useful for coating, and tungsten, another desirable metal, melts at 3370°C. Not only do such high temperatures make deposition of the metal from the vapor of the molten metal impractical, but also these vapors would be so hot as to significantly deteriorate the properties of the present magnetic transition metal-rare earth alloy powders.

Similarly, the coating of cobalt-rare earth particles by electroless plating techniques is not highly attractive since these methods require placing the very fine, generally 10 micron average particle size, and consequently very reactive cobalt-rare earth powders into contact with an aqueous solution which is highly acidic and results in the dissolution of significant amounts of material. These plating techniques also do not appear to produce a continuous uniform coating on these fine particles. In addition, long term deleterious effects on the magnetic properties of the cobalt-rare earth powders can be expected from the direct effects of the acidic aqueous solutions or from amounts of water entrapped within the metal coating in the thin layer of Co and $Sm_2O_3$ surrounding each particle which reacts slowly with the base cobalt-rare earth alloy.

The process of the present invention overcomes the disadvantages of the prior art and provides a solution to the oxidation problem of these reactive materials which obviates the sintering procedure by coating the powders with a coherent and non-reactive material without significantly affecting the magnetic properties of the powder. In the present process a metal coating is deposited on the powder by a metal vapor produced by the decomposition of an organometallic compound.

Briefly stated, the process of the present invention comprises providing particles of a magnetic transition metal-rare earth alloy, heating an organometallic compound to decompose said compound and produce a metal vapor, and contacting said metal vapor with said particles to deposit a coating of metal thereon.

The air-stable product of the present invention is comprised of particles of a transition metal-rare earth alloy enveloped by a coating of a material impervious to air, said material being selected from the group consisting of a vapor-deposited metal having a melting point higher than 500°C or an oxide of said vapor-deposited metal.

In the present process a magnetic transition metal-rare earth alloy, e.g., TRE, where T is a transition metal and RE is a rare earth metal, is used in particle form. The transition metal is selected from the group consisting of cobalt, iron, nickel, manganese and alloys thereof.

The rare earth metals useful in the present process are the 15 elements of the lanthanide series having atomic numbers 57 to 71 inclusive. The element yttrium (atomic number 39) is commonly included in this group of metals and, in this specification, is considered a rare earth metal. A plurality of rare earth metals can also be used to form the present intermetallic compounds which, for example may be ternary, quartenary or which may contain an even greater number of rear earth metals as desired. Mischmetal, an abundant common alloy of rare earth metals, is particularly advantageous.

Representative of the cobalt-rare earth compounds useful in the present invention are cobalt-cerium, cobaltpraseodymium, cobalt-neodymium, cobalt-promethium, cobaltsamarium, cobalt-europium, cobalt-gadolinium, cobalt-erbium, cobalt-thulium, cobalt-ytterbium, cobalt-lutecium, cobalt-yttrium, cobalt-lanthanum and cobalt-mischmetal. Examples of specific ternary compounds include cobalt-cerium-praseodymium, cobalt-yttrium-praseodymium, and cobalt-praseodymium-mischmetal.

Transition metal-rare earth intermetallic alloys or compounds exist in a variety of phases and each phase may vary in composition. A material substantially comprised of the $T_5RE$ single phase is particularly preferred in the present invention since this phase has shown the most desirable combination of magnetic properties.

The transition metal-rare earth compound or alloy of the present process can be prepared by a number of methods. For example, it can be prepared by melting the transition metal and rare earth metal together in the proper amounts under a substantially inert atmosphere such as argon and allowing the melt to solidify.

The alloy can be converted to particulate form in a conventional manner. For example, it can be crushed to a coarse size and then pulverized to a finer form by, for example, fluid energy milling in a substantially inert atmosphere. Alternatively, the powder can be produced initially by a reduction-diffusion process as set forth in copending application Ser. No. 172,290, filed on Aug. 16, 1971 in the name of Robert E. Cech, now U.S. Pat. No. 3,748,193. Also, in some instances, it may be desirable to grind sintered compacts of these powders to a desired particle size.

The particle size of the transition metal-rare earth alloy used in the present process may vary. It can be in as finely divided a form as desired. For best magnetic properties, average particle size will range from about 1 micron or less to about 10 microns. Larger sized particles can be used, but as the particle size is increased, the maximum coercive force obtainable is lower because the coercive force decreases with increasing particle size.

In the present process, an organometallic compound is used which can be a solid, liquid or gas at room temperature and which decomposes at temperatures lower than 500°C to produce a metal vapor. The metal vapor is contacted with the present TRE alloy powder to deposit metal thereon to form a continuous coating of metal which protects the powder from the atmosphere. The present coating process yields a coherent substantially uniform layer of metal and is accomplished in an atmosphere in which the reactants are inert. Typical inert atmospheres which are suitable in the present invention include argon, nitrogen or a vacuum. No water vapor or oxygen gas is present to degrade the magnetic properties of the alloy materials.

In carrying out the present process, the organometallic compound and the TRE alloy powder are preferably admixed to produce a substantially intimate mixture so that when the organometallic is decomposed, the resulting metal vapor, which deposits metal on contact with the surface of the alloy powder, will be distributed substantially uniformly throughout the powder to effectively deposit a continuous coating thereon and thereby provide a barrier to the atmosphere. If desired, mixing can be continued during decomposition of the organometallic to maintain a substantially intimate mixture. When the organometallic compound is a solid at room temperature, it is preferably used in a fine powder form in order that it can form an intimate mixture with the TRE alloy powder. When the organometallic is a liquid at room temperature, it should be admixed with the alloy powder to thoroughly wet the surfaces thereof. Alternatively, the organometallic compound may be vaporized and flowed through the alloy particles in such form. In yet another technique, the organometallic can be decomposed and the resulting metal vapor carried by an inert gas, such as argon, into contact with the alloy powder to deposit a coating thereon.

In some instances the uniform deposition of a metallic coating on TRE alloy powder may be hindered because the organometallic is not ferromagnetic in nature while the TRE alloy powder is. This problem may particularly occur when the organometallic compound is a solid at room temperature and when the organometallic and TRE alloy powder are simply mixed together prior to and/or during the coating process itself. Due to their magnetic nature, the TRE alloy powders may tend to conglomerate and so separate from the organometallic compound resulting in the deposition of an uneven metallic coating. The solution to this problem is to use a liquid organic carrier compound which will not attack and so magnetically degrade the TRE alloy powders and which will dissolve at least to a minor extent the organometallic desired for the coating operation. The organic carrier liquid can then be used to either dissolve or to form a slurry with the desired organometallic. Then this solution or slurry can be admixed with the TRE alloy powders in a conventional manner, e.g., either mechanically or magnetically agitated, to produce a substantially intimate mixture. The organic carrier liquid can then be removed by either gentle heating or the application of a vacuum or a combination of both of these. The organometallic will precipitate from the solution or slurry and coat the TRE alloy particles substantially uniformly. The TRE alloy particles now coated with an organometallic powder can then be heated under the appropriate conditions to decompose the organometallic and leave the desired metallic coating. Representative of the organic liquid carriers useful in the present invention are carbon tetrachloride; 1,1,-1-trichlorotrichloroethylene; 1,1,1trichloroethane and dimethyl sulfoxide.

A number of conventional techniques can be used to carry out the present process. However, best results are obtained by the use of a fluid bed reactor supporting the transition metal-rare earth alloy powder across which flows an inert gas stream bearing a significant partial pressure of the organometallic compound to be decomposed. Around the fluid bed is a furnace supplying a sufficient amount of heat to decompose the organometallic compound in the gas phase to produce a metal vapor which deposits a metal coating on the powder particles. The partial pressure of the organometallic compound should be sufficient to yield, when decomposed, a partial pressure of metal vapor sufficient to effectively deposit a metal coating on the particles which envelops the particles in a reasonable period of time, i.e., less than 8 hours. The particular useful partial pressure of organometallic compound is determinable empirically and generally is at least about $10^{-7}$ atmosphere.

Alternatively, another coating technique makes use of the magnetic properties of the particles themselves to help produce continuous coatings. For example, a mixture of the transition metal-rare earth alloy powder and the desired organometallic is stirred in a non-magnetic container by an external magnet while the temperature is raised to the point at which the organometallic decomposes producing a metal vapor which deposits metal on contact with the particles. In this embodiment an inert gas stream is passed through the container or a vacuum is pulled on the container during processing.

In the present process, the amount of organometallic compound used is determinable empirically. It should be used in an amount which, on decomposition, is sufficient to produce an amount of metal vapor which condenses on the exposed surfaces of the alloy particles to form a continuous coating of metal thereby preventing penetration by the atmosphere. Specifically, the amount of organometallic compound used should, upon decomposition, yield a significant partial pressure of metal vapor, generally at least about $10^{-7}$ atmosphere, sufficient to effectively coat the exposed surfaces of the alloy particles with a continuous coating of metal. The organometallic compound may decompose initially to yield the metal vapor or it may decompose to yield another organometallic vapor which is then decomposed to give the metal vapor. Preferably, the organometallic compound should be used in an amount which on decomposition, produces the metal in an amount ranging from 1 to 5% by weight of the alloy powder. From formulas and atomic weights, the weight relationships between the substances in the reaction can be calculated readily. Amounts of deposited metal less than 1% by weight of the alloy powder are likely to result in a discontinuous coating whereas amounts of deposited metal significantly greater than 5% by weight of the alloy powder will dilute the magnetic properties of the powder. Best results are attained with the metal being deposited in an amount of 2% by weight of the alloy powder.

The minimum thickness of the metal coating need only be sufficient to make it continuous, e.g., at least a film-forming thickness which is about one microinch, to prevent air from penetrating to the surface of the alloy particles. In some instances where a metal may form a porous oxide, thicker continuous coatings of the metal should be deposited to make the outer portion of such a metal coating available to be oxidized by the air leaving an inner continuous metal coating to maintain the stability of the magnetic properties of the alloy particles. However, a number of metals, for example, aluminum, form non-porous oxides which are effective barriers to air. Metal coatings significantly thicker than that necessary to provide the alloy particles with an effective barrier to the atmosphere provide no particular advantage since they do not improve magnetic stability and prevent a close packing of the alloy particles in the non-magnetic matrix thereby diluting the magnetic properties. Metal coatings thicker than necessary can be useful if such metal is also to serve as a matrix or partial matrix for supporting the particles.

One method of determining that the continuous coating of metal has been formed on the exposed surfaces of the alloy particles is to magnetize the coated particles, measure their intrinsic coercive force at room temperature, heat the particles in air at an elevated temperature, for example 100°C, for a significant period of time, i.e., at least about 30 minutes, and remeasure their intrinsic coercive force at room temperature. If the intrinsic coercive force of the coated particles after heating is not significantly lower than before the heating, the particles can be considered as being effectively coated in accordance with the present invention.

In the present invention the solid metal coating should have a number of properties. Specifically, it should provide a barrier to the atmosphere, and also, if desired, the metal coating can be chosen for some other desired property, e.g., ductility. The metal, itself, should have no significant deteriorating effect on the magnetic properties of the powder. It should be non-magnetic or so weakly magnetic as not to diminish the magnetic properties of the powder significantly.

In the present invention, the particular deposited coating can be composed of more than one metal to form an alloy depending on the particular properties desired. A plurality of metals, for example Cu and Zn, can either be deposited sequentially or concomitantly in any proportion to form an alloy coating on the particles.

The non-metallic products of decomposition are gaseous, or usually evaporate from the alloy particles during the decomposition step, or can be evaporated therefrom at temperatures below 500°C, such removal being preferably promoted by a flowing atmosphere or a substantial vacuum. Since the non-metallic products of decomposition are much less dense and significantly more easily vaporizable than the deposited metal, they do not interfere with the formation of continuous metal coatings in the present invention.

In the present process, there are a number of useful organometallic compounds which decompose at temperatures below 500°C. Typical of these is triisobutylaluminum as a source of aluminum. Specifically, the metal coating of aluminum can be deposited according to the following reactions:

1. 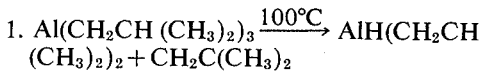

2. 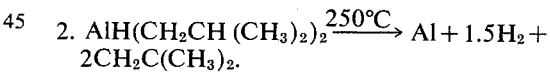

This operation must be accomplished at reduced pressures because the triisobutylaluminum can't be successfully distilled above 10mm Hg.

There are a number of advantages to the use of triisobutylaluminum and other organometallics which decompose in a similar manner. One advantage is that the low temperature at which this organometallic decomposes will not affect the magnetic properties of the transition metal-rare earth alloy powder. Another advantage is that the amount of chemical interaction between the aluminum and the alloy powder should be minimal at these temperatures. Yet another advantage is that the hydrogen gas present can be expected to reduce any surface oxides present on the alloy particles. Also, although it has been reported that cobalt-rare earth alloy powder absorbs hydrogen, pressures of $H_2$ somewhat in excess of 76 cm Hg are needed. Therefore this proposed process working with a low residual pressure, ~10mm Hg, should minimize deleterious effects due to hydrogen absorption. In addition, the organometallic decomposition reaction is relatively clean and yields products, except for elemental Al, which are gases and are accordingly easily removed from the coated powders.

A typical example of an organometallic useful in the present invention for the vapor deposition of copper is phenylcopper, $C_6H_5Cu$, which thermally degrades according to the following reaction:

This reaction affords advantages similar to those listed for the Al deposition, and in addition, it takes place at a very low temperature.

Table I lists a partial series of elemental metals useful as coatings and their organometallic compounds suitable for the present process. In the present invention, metal carbonyls are assumed to be organometallic compounds.

TABLE I

| Metal | Organometallic Compound |
|---|---|
| Cu | Copper formate, $Cu(CHO_2)_2$ |
|  | Copper acetylacetonate ($Cu(CH_3COCHCOCH_3)_2$) |
|  | Methylcopper, $CuCH_3$ |
| Ni | Nickel carbonyl, $Ni(CO)_4$ |
| Fe | Iron carbonyl $Fe(CO)_5$ |
| Cr | Chrominum carbonyl, $Cr(CO)_6$ |
|  | Bisbenzene chromium, $Cr(C_6H_6)_2$ |
| Mo | Molybdenum carbonyl, $Mo(CO)_6$ |
|  | Bisbenzene molybdenum, $Mo(C_6H_6)_2$ |
|  | Benzene molybdenum carbonyl, $C_6H_6 Mo(CO)_3$ |
| W | Dibenzene tungsten, $W(C_6H_6)_2$ |
|  | Mesitylene tungsten carbonyl, $(CH_3)_3 C_6H_3 W(CO)_3$ |
|  | Tungsten carbonyl, $W(CO)_6$ |
| Ru | Ruthenium carbonyl, $Ru(CO)_5$ and/or $Ru_2(CO)_9$ |
| Ir | Iridium carbonyl, $Ir_2(CO)_8$ |
| V | Vanadium carbonyl, $V(CO)_6$ |
|  | Bisbenzene vanadium, $(C_6H_6)_2V$ |
| Hf | Dicyclopentadienyl hafnium dichloride, $(C_5H_5)_2 Hf Cl_2$ |
| Ta | Tantalum methylcyclopentadienyl tetracarbonyl, $CH_3C_5H_5Ta(CO)_4$ |
| Nb | Niobium methylcyclopendadienyl tetracarbonyl, $CH_3C_5H_5Nb(CO)_4$ |
| Zn | Diethylzinc, $Zn(C_2H_5)_2$ |
|  | Dimethyl zinc, $Zn(CH_3)_2$ |
|  | Zinc acetylacetonate ($Zn(CH_3COCHCOCH_3)_2$) |
| Be | Diethyl beryllium, $(C_2H_5)_2Be$ |
| Mg | Diphenylmagnesium, $Mg(C_6H_5)_2$ |
|  | Diethylmagnesium, $Mg(C_2H_5)_2$ |
| Sn | Tetramethyl tin, $Sn(CH_3)_4$ |
| Bi | Trimethyl bismuth, $Bi(CH_3)_3$ |
| Au | Diethyl gold bromide, $((C_2H_5)_2 AuBi)_2$ |
| Pb | Tetraethyl lead, $Pb(C_2H_5)_4$ |
| Mn | Dicyclopentadienyl manganese, $(C_5H_5)_2Mn$ |
| Re | Rhenium carbonyl, $Re_2(CO)_{10}$ |
| Rh | Rhodium carbonyl, $Rh_2(CO)_8$ |
| Ti | Dicyclopentadienyl titanium, $(C_5H_5)_2Ti$ |

In addition to the above organometallics listed in Table I, there are a number of trifluoroacetylacetonates and hexafluoroacetylacetonates of various metals, e.g., Zn and Zr which could yield the desired metal coating. Hydrates of some of the above organometallics can be used in place of the anhydrous compounds in which case the water of hydration will be expected to be removed rapidly on heating, e.g., by a flowing inert gas stream or a vacuum.

The present metal-coated particles are useful in the manufacture of magnets which are air-stable, e.g., their magnetic properties do not deteriorate significantly in air, at room temperature as well as at elevated temperatures which do not affect the barrier coating significantly. Specifically, the coated alloy particles of the present invention can be incorporated in a nonmagnetic matrix to form magnets. The coated particles can be magnetized before or after incorporation in the non-magnetic matrix, as desired, to produce the magnet.

The non-magnetic matrix used in forming the magnets of the present invention can vary widely. It can be, for example, a plastic or resin, an elastomer, or rubber, or a non-magnetic metal such as, for example, lead, tin, zinc, copper or aluminum. The extent to which the coated alloy particles are packed in the matrix depends largely upon the particular magnet properties desired.

Magnets having useful magnetic properties for a wide range of applications are produced when the coated alloy particles of the present invention are incorporated in a nonmagnetic matrix and magnetized. The magnets of the present invention are useful in telephones, electric clocks, radios, television, and phonographs. They are also useful in portable appliances, such as electric toothbrushes and electric knives, and to operate automobile accessories. In industrial equipment, the present magnets can be used in such diverse applications as meters and instruments, magnetic separators, computers and microwave devices.

All parts and percentages used herein are by weight unless otherwise noted.

In the following examples the intrinsic coercive force of each sample was measured at room temperature. Specifically, a specimen of the powder was prepared for magnetic measurement by introducing it into a body of molten paraffin wax in a small glass tube and cooling the wax in an aligning magnetic field of 20,000 oersteds to align the particles along their easy axis until the paraffin solidified. The intrinsic coercive force of the sample was then measured after applying a magnetizing field of 30,000 oersteds.

EXAMPLE 1

A sintered body of compacted CoSm alloy powder, prepared substantially as set forth in U.S. Pat. No. 3,655,464, was ground to a powder using a jaw crusher and a jet mill. The alloy powder was comprised substantially of $Co_5Sm$ phase and a minor amount of $Co_7Sm_2$ phase. Approximately 5 grams of the alloy powder having a size of −325 mesh (U.S. Standard Screen Size), e.g., and average particle size of about 6 microns, were placed in a U-tube along with about 1 gram of copper acetylacetonate, present as the hydrate $Cu(CH_3COCHCOCH_3)_2 \cdot 2H_2O$, and in powder form which was calculated to yield copper in an amount of about 2% by weight of the alloy powder. A slow stream of argon gas was passed through the U-tube across the mixture which was mixed by moving a magnet beneath it. After a few minutes, a period of time considered suitable for the removal of the majority of oxygen present by the argon stream, the mixture was first gently heated with Meeker burner and occasionally during the entire heating process a magnet was used to stir up the mixture to assist both in driving off the water of hydration and in obtaining a more uniform metal coating on the alloy particles. The temperature of the mixture was then raised slowly to about 400°C to accelerate the decomposition of the copper acetylacetonate.

After a minute or two a brown coating was observed being deposited on the alloy particles and on the walls of the U-tube. Heating was continued for several more minutes then stopped. The coated alloy particles were allowed to cool to room temperature with argon continuing to flow over them. After the powders were cool a magnet was used to separate the coated alloy particles from a small amount of non-magnetic material present, presumably unreacted copper acetylacetonate and elemental Cu metal.

The alloy particles were examined under an optical microscope and by scanning electron microscopy. They appeared to be enveloped by a continuous uniform brown coating of copper metal.

The intrinsic coercive force, $H_{ci}$, of a portion of these copper-coated particles, as well as of a portion of the uncoated particles of the same composition and size, was determined and the results are shown in Run No. 1 of Table II.

The copper-coated particles, as well as the uncoated particles of the same composition and size, were placed in an oven having an air atmosphere and maintained at a temperature of 92°C. At the end of each period of time indicated in Table II, a portion of the copper coated particles as well as a portion of the uncoated particles were removed from the oven and cooled in air to room temperature. The intrinsic coercive force, $H_{ci}$, of each such portion was then determined and the results are shown in Table II.

TABLE II

| Run No. | Time (Hours) | $H_{ci}$ Uncoated Particles | $H_{ci}$ Cu-Coated Particles |
|---|---|---|---|
| 1 | 0 | 7,550 | 9,960 |
| 2 | 16 | 6,360 | 10,660 |
| 3 | 24 | 6,060 | 10,730 |
| 4 | 40 | 6,150 | 10,930 |
| 5 | 112 | 6,260 | 11,450 |

As shown by Table II, the copper-coated particles had an intrinsic coercive force initially higher than that of the uncoated particles, and after being heated at 92°C in air for periods of time as long as 112 hours, the intrinsic coercive force of the copper-coated particles improved significantly whereas that of the uncoated particles deteriorated significantly. This indicates that the copper coating provided an effective barrier to the atmosphere to prevent atmospheric oxygen from reacting with and degrading the magnetic properties of the $Co_5Sm$ powder. In addition, the significant increase in intrinsic coercive force of the copper-coated particles after heating may be due to removal of sites for reverse domain initiation on the now protected surface of the alloy particles.

EXAMPLE 2

Copper-coated $Co_5Sm$ alloy particles were prepared as set forth in Example 1. Solid polyproplene powder in an amount of about 3.5% by weight of the copper-coated alloy particles was admixed therewith and the mixture was placed in a die press. An aligning magnetizing field of 20,000 oersteds was applied to the mixture to align the alloy particles along their easy axis during pressing. The temperature of the press was raised to 200°C to liquify the polyproplene and a pressure of 100,000 psi was applied at this temperature for about 5 minutes. The press was then allowed to cool to room temperature in the magnetizing aligning field.

The resulting solid compact was removed from the press and was magnetized in a field of 60,000 kilooersteds. Its energy product was determined to be 4 MGOe.

EXAMPLE 3

In this example the cobalt-samarium alloy powder used was substantially the same as that set forth in Example 1. The intrinsic coercive force of portions of the powder was determined before and after annealing in an air oven at 150°C for 30 minutes and the results are shown in Run No. 6 of Table III.

Portions of the alloy powder were coated with metal substantially as set forth in Example 1. Specifically, chromium hexacarbonyl, $Cr(CO)_6$, in an amount of about 4% by weight of the alloy powder, was admixed therewith and the mixture placed in a U-tube where it was maintained under a stream of argon and substantially continuously mixed with a magnet. It was calculated that in this mixture chromium hexacarbonyl would yield chromium in an amount of 1% by weight of the alloy powder. At a temperature of 400°C the chromium hexacarbonyl decomposed, and after about a minute, a silvery coating was observed on the alloy powder and on the walls of the tube. Heating and mixing was continued for about 10 additional minutes to insure complete coating of the particles with chromium and then stopped. The chromiumcoated alloy particles were cooled to room temperature under argon. A magnet was then used to separate the coated particles from a small amount of non-magnetic material present. The intrinsic coercive force of a portion of the coated powder was determined and is shown in Run No. 7. The remaining coated powder was heated in an air oven at 150°C for 30 minutes, then cooled to room temperature and its intrinsic coercive force determined as shown in Run No. 7 of Table III.

The procedure used in Run No. 8 was the same as that of Run No. 7 except that chromium hexacarbonyl was used in an amount of 20% by weight of the alloy powder which was calculated to yield chromium in an amount of 5% by weight of the alloy powder.

In Run No. 9 triisobutylaluminum was used in an amount which coated the alloy particles with aluminum in an amount of about 2% by weight of the alloy powder. The coating procedure differed from Run No. 7 in that a double U-tube was used wherein the triisobutylaluminum was placed in one U-curve and the alloy powder was placed in the second U-curve. The triisobutylaluminum was decomposed at a temperature of 250°C and the resulting aluminum vapor was carried by the argon stream into contact with the alloy powder where it condensed on the powder which was being continuously mixed with a magnet to insure the deposition of a continuous uniform coating of aluminum.

The metal-coated particles of Runs 7–9 were examined under an optical microscope and a scanning electron microscope. They appeared to be completely and substantially uniformly coated by metal.

The intrinsic coercive forces of the uncoated and coated powders, before and after annealing in air, are given in Table III.

TABLE III

| Intrinsic Coercive Force,$H_{ci}$ (oersteds) | Run No. 6 Control | Run No. 7 1% Cr | Run No. 8 5% Cr | Run No. 9 2% Al |
|---|---|---|---|---|
| Original | 7080 | 7420 | 6420 | 8250 |
| 1/2 hr. at 150°C | 5210 | 8350 | 7650 | — |
| 16 hrs. at 175°C | — | — | — | 9900 |

As illustrated by Table III, the intrinsic coercive force of Run No. 6, the uncoated control powder, deteriorated significantly after 30 minutes at 150°C whereas the intrinsic coercive force of the metal coated particles of Run No. 7 through 9, which illustrate the present invention, increased significantly after the annealing treatment in air. This indicates that the present metal-coated particles provided an effective barrier to the atmosphere to prevent atmospheric oxygen and moisture from reacting with and deteriorating the magnetic properties of the present alloy powder.

In copending U.S. Pat. application Ser. No. 372,688 now U.S. Pat. No. 3,856,581, entitled "Annealed Air-Stable Magnetic Materials Having Superior Magnetic Characteristics And Method" filed of even date herewith in the names of Richard J. Charles and John G. Smeggil there is disclosed a process for producing air-stable coated particles of a magnetic material which comprises providing particles of a transition metal-rare earth alloy and an organometallic compound which decomposes at a temperature lower than 500°C, heating the organometallic compound to decompose it to produce a metal vapor, contacting the metal vapor with the particles of transition metal-rare earth alloy to deposit a metal coating thereon which substantially envelops the particles, and heating the metal coated particles at a temperature ranging from about 50°C to 200°C to increase their intrinsic coercive force by at least 10%.

In copending U.S. Pat. application Ser. No. 372,690 now U.S. Pat. No. 3,856,582, entitled "Fabrication of Matrix Bonded Transition Metal-Rare Earth Alloy Magnets" filed of even date herewith in the names of Richard J. Charles and John G. Smeggil there is disclosed a process for producing an air-stable porous magnetic compact which comprises admixing particles of a transition metal-rare earth alloy with an organometallic compound which decomposes at a temperature below 500°C and pressing the mixture to form a green body. The green body is heated to decompose the organometallic compound to produce a non-metallic product and a metal vapor. The metal vapor deposits an interconnecting continuous coating of metal on the exposed surfaces of the pressed alloy particles thereby preventing penetration by the atmosphere, and the non-metallic product is outgassed from the body leaving the resulting coated compact porous.

All of the above cited applications are, by reference, made part of the disclosure of the present application.

What is claimed is:

1. An air-stable product for the manufacture of a permanent magnet, said product being comprised of particles of cobalt-rare earth alloy enveloped by a coating impervious to air, said coating being selected from the group consisting of a vapor-deposited metal having a melting point higher than 500°C or an oxide of said vapor-deposited metal, said product being produced by a process for coating a metal having a melting point above 500°C on cobalt-rare earth alloy particles without significantly deteriorating their permanent magnet properties producing magnetically air-stable particles which comprises providing particles of cobalt-rare earth alloy having an average size up to about 10 microns, providing an organometallic compound which at a temperature below 500°C decomposes and yields products of decomposition consisting of gaseous non-metallic product and a metal vapor, placing said compound and said particles in a substantially inert atmosphere which is a flowing atmosphere or a substantial vacuum, heating said organometallic compound at a temperature below 500°C and substantially completely decomposing it and producing said gaseous product of decomposition and a metal vapor, contacting the resulting metal vapor with the cobaltrare earth alloy particles depositing a coherent substantially uniform metal coating which at least envelops the particles providing an effective barrier to the atmosphere and which has no significant deteriorating effect on their magnetic properties and diffusing away the non-metallic gaseous products of decomposition, said organometallic compound being used in an amount which on decomposition yields a partial pressure of metal vapor of at least about $10^{-7}$ atmosphere and produces the metal in an amount ranging from 1 to 5% by weight of said cobalt-rare earth alloy particles and said deposited metal having a melting point above 500°C.

2. An air-stable product according to claim 1 wherein said vapor-deposited metal is aluminum.

3. An air-stable product according to claim 1 wherein said vapor-deposited metal is copper.

4. An air-stable magnet having as the active magnetic component the particles of claim 1.

* * * * *